(12) United States Patent
Shelnutt et al.

(10) Patent No.: US 10,823,439 B2
(45) Date of Patent: Nov. 3, 2020

(54) SYSTEMS AND METHODS FOR RELIABILITY CONTROL OF INFORMATION HANDLING SYSTEM

(71) Applicant: Dell Products L.P., Round Rock, TX (US)

(72) Inventors: Austin M. Shelnutt, Leander, TX (US); Edmond I. Bailey, Cedar Park, TX (US); John R. Stuewe, Round Rock, TX (US); Steven Embleton, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 15/378,999

(22) Filed: Dec. 14, 2016

(65) Prior Publication Data

US 2018/0163985 A1 Jun. 14, 2018

(51) Int. Cl.

| F24F 11/30 | (2018.01) |
|---|---|
| H04L 12/26 | (2006.01) |
| F24F 11/65 | (2018.01) |
| F24F 11/64 | (2018.01) |
| F24F 11/32 | (2018.01) |
| F24F 110/20 | (2018.01) |
| F24F 110/10 | (2018.01) |

(52) U.S. Cl.
CPC .............. *F24F 11/30* (2018.01); *F24F 11/32* (2018.01); *F24F 11/64* (2018.01); *F24F 11/65* (2018.01); *H04L 43/0817* (2013.01); *F24F 2110/10* (2018.01); *F24F 2110/20* (2018.01)

(58) Field of Classification Search
CPC ..... G06F 11/3058; H05K 7/207; F25D 21/04; B60H 1/00785; B60H 1/00642; G01N 25/56; G01N 25/66; G01N 25/68; G01N 17/00; G01N 21/3554; G01N 21/94; G05B 2219/23227; G05B 2219/23317
See application file for complete search history.

(56) References Cited

U.S. PATENT DOCUMENTS

| 4,449,764 | A | * | 5/1984 | Hastings | .................... E05G 5/02 |
|---|---|---|---|---|---|
| | | | | | 261/106 |
| 4,745,564 | A | * | 5/1988 | Tennes | ..................... G01P 1/127 |
| | | | | | 346/33 D |
| 5,240,177 | A | * | 8/1993 | Muramatsu | ............ G05D 22/02 |
| | | | | | 236/44 C |
| 5,446,369 | A | * | 8/1995 | Byrne | ..................... G01N 17/00 |
| | | | | | 204/404 |

(Continued)

*Primary Examiner* — Darrin D Dunn
(74) *Attorney, Agent, or Firm* — Jackson Walker L.L.P.

(57) ABSTRACT

In accordance with embodiments of the present disclosure, a controller may include one or more environmental sensor inputs configured to receive data from one or more environmental sensors integral to an information handling system and a microcontroller unit communicatively coupled to the one or more environmental sensor inputs. The microcontroller unit may be configured to monitor the one or more environmental sensor inputs for one or more reliability-impacting events affecting or likely to affect operability of the information handling system and in response to an occurrence of a reliability-impacting event, apply an event-based policy affecting operation of one or more components of the information handling system.

14 Claims, 2 Drawing Sheets

(56) References Cited

U.S. PATENT DOCUMENTS

| | | | | |
|---|---|---|---|---|
| 5,936,523 A * | 8/1999 | West | G08B 13/1481 | 340/545.2 |
| 6,253,834 B1 * | 7/2001 | Sterner | G06F 1/203 | 165/104.34 |
| 6,453,266 B1 * | 9/2002 | Chainer | G06F 1/1613 | 340/506 |
| 6,490,874 B2 * | 12/2002 | Chu | H05K 5/0213 | 62/271 |
| 7,818,156 B2 * | 10/2010 | Vachhani | C10G 7/10 | 208/47 |
| 7,865,253 B2 * | 1/2011 | Harrington | G11B 19/042 | 700/21 |
| 8,290,629 B1 * | 10/2012 | Mateski | H05K 7/20836 | 137/2 |
| 8,330,305 B2 * | 12/2012 | Hart | H04M 1/185 | 307/650 |
| 8,570,179 B2 * | 10/2013 | Holloway | F16P 3/14 | 340/539.22 |
| 8,786,462 B2 * | 7/2014 | Bowman | H04Q 9/00 | 340/870.02 |
| 9,097,772 B2 * | 8/2015 | Kromrey | G01R 31/362 | |
| 9,109,989 B2 * | 8/2015 | Hamann | G01N 17/04 | |
| 9,146,207 B2 * | 9/2015 | Harper | G06F 1/1656 | |
| 9,152,178 B2 * | 10/2015 | Koch | G06F 1/206 | |
| 9,164,519 B2 * | 10/2015 | Holloway | G05B 19/0428 | |
| 9,689,887 B1 * | 6/2017 | Srinivas | G01B 21/18 | |
| 9,834,732 B2 * | 12/2017 | Wang | G05B 23/0221 | |
| 9,927,853 B2 * | 3/2018 | Vichare | G06F 1/206 | |
| 9,983,621 B1 * | 5/2018 | Menon | G06F 1/1626 | |
| 10,048,733 B2 * | 8/2018 | David | G06F 1/28 | |
| 10,211,753 B2 * | 2/2019 | Tsukano | F24F 1/24 | |
| 2003/0163287 A1 * | 8/2003 | Vock | A43B 3/0005 | 702/187 |
| 2004/0050072 A1 * | 3/2004 | Palfy | A42B 3/24 | 62/3.4 |
| 2004/0050076 A1 * | 3/2004 | Palfy | A42B 3/24 | 62/155 |
| 2006/0010967 A1 * | 1/2006 | Matsuo | G01N 25/56 | 73/73 |
| 2006/0213267 A1 * | 9/2006 | Tronconi | G01P 15/18 | 73/510 |
| 2007/0043485 A1 * | 2/2007 | Meissner | B60R 21/01562 | 701/45 |
| 2007/0218732 A1 * | 9/2007 | Honda | H04R 1/021 | 439/188 |
| 2007/0253093 A1 * | 11/2007 | Cook | G11B 19/042 | 360/75 |
| 2008/0106366 A1 * | 5/2008 | Zhang | G06F 21/88 | 340/5.1 |
| 2008/0218366 A1 * | 9/2008 | Chen | G11B 19/043 | 340/669 |
| 2008/0232063 A1 * | 9/2008 | Koo | F25B 21/02 | 361/679.48 |
| 2008/0253015 A1 * | 10/2008 | Harrington | G11B 19/042 | 360/75 |
| 2008/0304236 A1 * | 12/2008 | Murakami | H05K 7/207 | 361/699 |
| 2010/0085197 A1 * | 4/2010 | Delia | G01W 1/00 | 340/601 |
| 2010/0097208 A1 * | 4/2010 | Rosing | G06Q 50/30 | 340/539.13 |
| 2010/0142104 A1 * | 6/2010 | Cooper | H02H 3/32 | 361/49 |
| 2010/0185401 A1 * | 7/2010 | Hernandez | F17D 5/00 | 702/25 |
| 2010/0300284 A1 * | 12/2010 | Bash | G05D 22/02 | 95/10 |
| 2011/0101118 A1 * | 5/2011 | Criss | F24F 13/22 | 236/44 C |
| 2011/0118896 A1 * | 5/2011 | Holloway | G05B 19/0428 | 700/300 |
| 2011/0129705 A1 * | 6/2011 | Lee | H02J 7/0031 | 429/90 |
| 2011/0279978 A1 * | 11/2011 | Yoshikawa | H01L 23/427 | 361/700 |
| 2011/0292601 A1 * | 12/2011 | Campbell | F24F 3/14 | 361/691 |
| 2012/0053861 A1 * | 3/2012 | Kremer | C10G 75/02 | 702/50 |
| 2012/0216992 A1 * | 8/2012 | So | H05K 5/0213 | 165/104.33 |
| 2012/0289217 A1 * | 11/2012 | Riemer | H04M 1/72577 | 455/418 |
| 2012/0331119 A1 * | 12/2012 | Bose | H04L 61/2015 | 709/223 |
| 2013/0020397 A1 * | 1/2013 | Branham | F24F 11/0001 | 236/44 A |
| 2013/0048535 A1 * | 2/2013 | Wang | C10G 75/02 | 208/47 |
| 2013/0054180 A1 * | 2/2013 | Barfield | G01P 15/0891 | 702/138 |
| 2013/0063602 A1 * | 3/2013 | Scapier | H04N 7/185 | 348/160 |
| 2013/0138715 A1 * | 5/2013 | Petersen | H04M 1/24 | 709/203 |
| 2013/0138997 A1 * | 5/2013 | Wang | H04L 41/0663 | 714/4.11 |
| 2013/0182360 A1 * | 7/2013 | Stevens | H02H 5/00 | 361/71 |
| 2013/0220423 A1 * | 8/2013 | Campbell | F17D 3/00 | 137/1 |
| 2013/0226364 A1 * | 8/2013 | Artman | G06F 1/206 | 700/300 |
| 2013/0257582 A1 * | 10/2013 | Rothkopf | G06F 1/1656 | 340/3.1 |
| 2013/0265064 A1 * | 10/2013 | Hamann | G01N 17/04 | 324/700 |
| 2013/0265153 A1 * | 10/2013 | Taylor | G08B 21/182 | 340/539.1 |
| 2013/0335716 A1 * | 12/2013 | Shields | B44F 1/10 | 353/99 |
| 2014/0049774 A1 * | 2/2014 | Horii | G01N 21/274 | 356/237.3 |
| 2014/0159634 A1 * | 6/2014 | Yokoyama | H05K 7/20836 | 318/471 |
| 2014/0180953 A1 * | 6/2014 | Westcott | A23B 7/148 | 705/332 |
| 2014/0237268 A1 * | 8/2014 | Mese | G06F 1/26 | 713/300 |
| 2014/0253093 A1 * | 9/2014 | Bermudez Rodriguez | G06Q 10/083 | 324/76.11 |
| 2014/0285333 A1 * | 9/2014 | Imamura | G01P 15/0891 | 340/436 |
| 2014/0307356 A1 * | 10/2014 | Hong | H02H 5/083 | 361/78 |
| 2014/0321879 A1 * | 10/2014 | Sato | G03G 21/203 | 399/97 |
| 2015/0016001 A1 * | 1/2015 | Quirk | H02H 5/083 | 361/78 |
| 2015/0022357 A1 * | 1/2015 | Gettings | G08B 3/00 | 340/568.1 |
| 2015/0068702 A1 * | 3/2015 | So | H05K 7/20272 | 165/11.1 |
| 2015/0124390 A1 * | 5/2015 | Koch | G06F 1/1633 | 361/679.26 |
| 2015/0171491 A1 * | 6/2015 | Lim | H01M 10/625 | 429/50 |
| 2015/0234363 A1 * | 8/2015 | Yoon | H02J 7/0036 | 320/137 |
| 2015/0241370 A1 * | 8/2015 | Mueller | G01K 1/20 | 345/173 |
| 2015/0338315 A1 * | 11/2015 | Manahan | G01M 99/008 | 702/183 |
| 2015/0346127 A1 * | 12/2015 | Kalinichev | G01N 27/048 | 361/86 |

(56) References Cited

U.S. PATENT DOCUMENTS

| | | | | |
|---|---|---|---|---|
| 2016/0041085 A1* | 2/2016 | England | G01N 17/043 | |
| | | | 436/6 | |
| 2016/0063433 A1* | 3/2016 | Glasgow | G06Q 10/0832 | |
| | | | 705/332 | |
| 2016/0080553 A1* | 3/2016 | Dempster | H04M 1/72569 | |
| | | | 455/550.1 | |
| 2016/0154439 A1* | 6/2016 | Rothkopf | G06F 1/1656 | |
| | | | 340/3.1 | |
| 2016/0195566 A1* | 7/2016 | Vock | G01G 23/00 | |
| | | | 73/514.01 | |
| 2016/0286389 A1* | 9/2016 | Cai | H04W 12/02 | |
| 2016/0361973 A1* | 12/2016 | Mayer | B60H 1/00764 | |
| 2017/0013744 A1* | 1/2017 | Shelnutt | F28F 27/02 | |
| 2017/0030888 A1* | 2/2017 | Vandersleen | G01N 33/5091 | |
| 2017/0065210 A1* | 3/2017 | Borkholder | A63B 71/10 | |
| 2017/0074899 A1* | 3/2017 | Oouchi | G01P 15/18 | |
| 2017/0089607 A1* | 3/2017 | Vichare | G06F 1/206 | |
| 2017/0092405 A1* | 3/2017 | Manahan | H01F 7/064 | |
| 2017/0099746 A1* | 4/2017 | Rubenstein | H05K 1/0203 | |
| 2017/0160775 A1* | 6/2017 | Sun | G06F 1/20 | |
| 2017/0168531 A1* | 6/2017 | Casparian | G06F 1/206 | |
| 2017/0208707 A1* | 7/2017 | Teeter | H05K 7/20727 | |
| 2017/0295677 A1* | 10/2017 | Shelnutt | H05K 7/20836 | |
| 2017/0344175 A1* | 11/2017 | Hung | G06F 3/0488 | |
| 2017/0347473 A1* | 11/2017 | Freer | H05K 5/0213 | |
| 2017/0372585 A1* | 12/2017 | Iv Evangelista | G01P 15/0891 | |
| 2018/0007164 A1* | 1/2018 | Ruxton | H04L 43/10 | |
| 2018/0039313 A1* | 2/2018 | David | G06F 1/28 | |
| 2018/0059695 A1* | 3/2018 | Carignan | G05D 27/02 | |
| 2018/0149623 A1* | 5/2018 | Notohardjono | G01P 15/0891 | |
| 2018/0157211 A1* | 6/2018 | Tomiyasu | G03G 21/0005 | |
| 2018/0164728 A1* | 6/2018 | Mandachi | B41J 29/377 | |
| 2018/0292877 A1* | 10/2018 | David | G06F 1/28 | |
| 2018/0367059 A1* | 12/2018 | Tsukano | F24F 1/24 | |
| 2019/0220105 A1* | 7/2019 | Noma | G06F 3/0383 | |

* cited by examiner

SYSTEMS AND METHODS FOR RELIABILITY CONTROL OF INFORMATION HANDLING SYSTEM

TECHNICAL FIELD

The present disclosure relates in general to information handling systems, and more particularly to reliability control of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Manufacturers commonly deliver pre-integrated and validated racks of information handling systems, thus allowing consumers of such systems to receive fully-populated, cabled, and tested racks which they can simply transfer from their point of delivery to their data center environments without requiring the use of teams of technicians to assemble the racks on site. However, compared with shipping an individual server in an enclosed package that is drop tested and sealed with moisture-absorbing desiccant, shipping of a pre-integrated rack with servers may present unique challenges with respect to non-operational reliability concerns. In particular, the volume and mass of a pre-integrated rack may make it susceptible to condensation and shock events during shipment that may be difficult and expensive to completely eliminate from the shipping process.

SUMMARY

In accordance with the teachings of the present disclosure, one or more disadvantages and problems associated with ensuring operability of an information handling system may be reduced or eliminated.

In accordance with embodiments of the present disclosure, a controller may include one or more environmental sensor inputs configured to receive data from one or more environmental sensors integral to an information handling system and a microcontroller unit communicatively coupled to the one or more environmental sensor inputs. The microcontroller unit may be configured to monitor the one or more environmental sensor inputs for one or more reliability-impacting events affecting or likely to affect operability of the information handling system and in response to an occurrence of a reliability-impacting event, apply an event-based policy affecting operation of one or more components of the information handling system.

In accordance with these and other embodiments of the present disclosure, a method may include receiving data from one or more environmental sensors integral to an information handling system, monitoring the one or more environmental sensor inputs for one or more reliability-impacting events affecting or likely to affect operability of the information handling system, and in response to an occurrence of a reliability-impacting event, applying an event-based policy affecting operation of one or more components of the information handling system.

In accordance with these and other embodiments of the present disclosure, an information handling system may include one or more environmental sensors a controller comprising one or more environmental sensor inputs configured to receive data from the one or more environmental sensors and a microcontroller unit communicatively coupled to the one or more environmental sensor inputs. The microcontroller unit may be configured to monitor the one or more environmental sensor inputs for one or more reliability-impacting events affecting or likely to affect operability of the information handling system and in response to an occurrence of a reliability-impacting event, apply an event-based policy affecting operation of one or more components of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
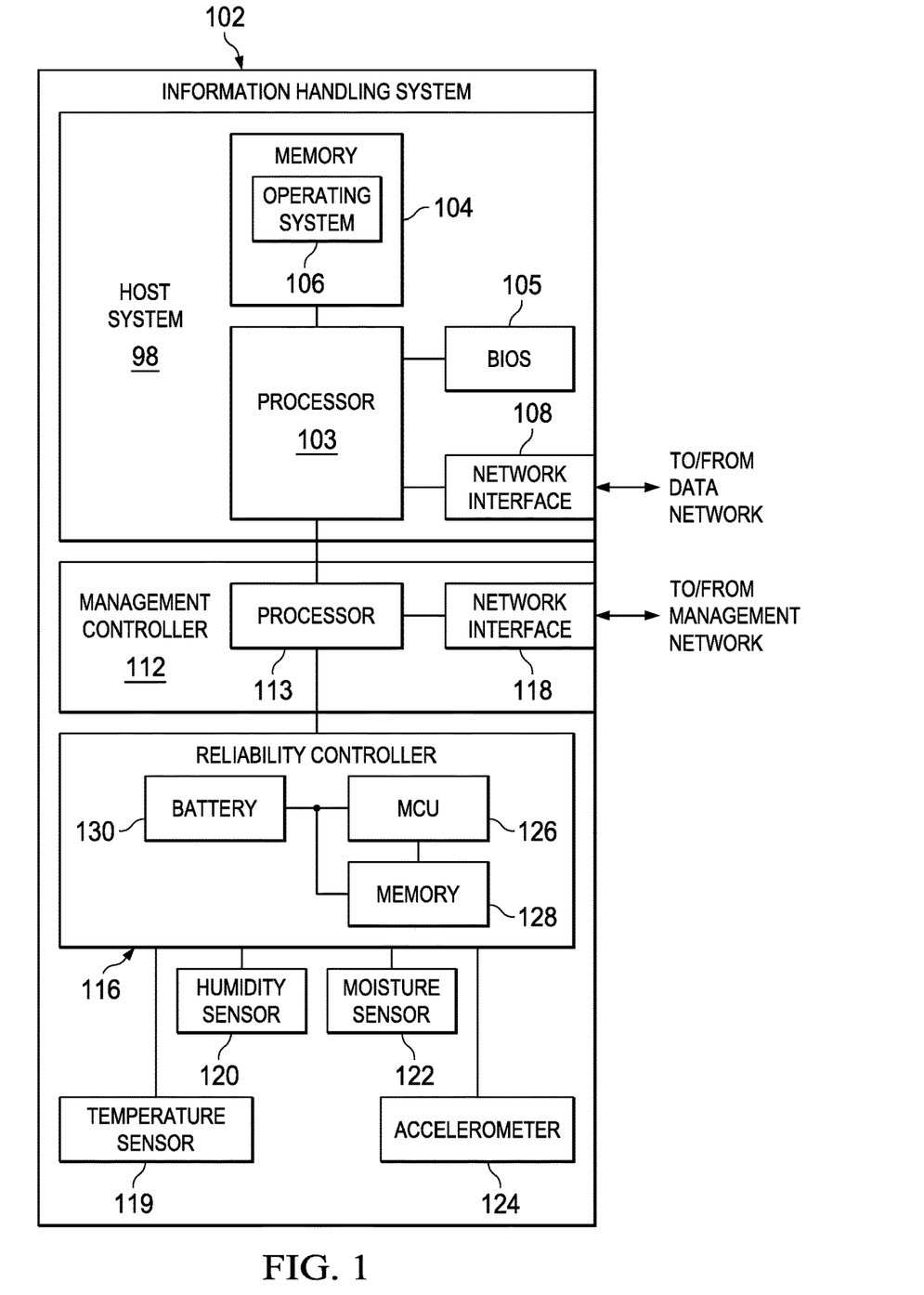
FIG. 1 illustrates a block diagram of an example information handling system, in accordance with certain embodiments of the present disclosure.
Figure 2:
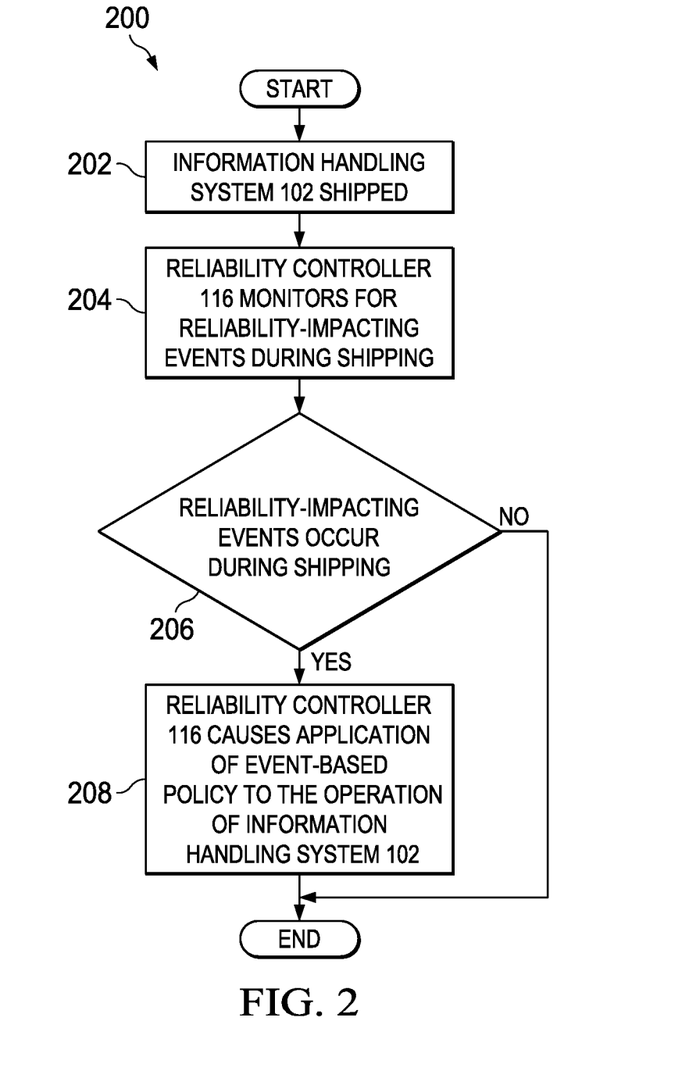
FIG. 2 illustrates a flow chart of an example method for reliability control of an information handling system, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

FIG. 1 illustrates a block diagram of an example information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, a management controller 112 communicatively coupled to processor 103, a reliability controller 116 communicatively coupled to a processor 113, and one or more environmental sensors (e.g., temperature sensor 119, humidity sensor 120, moisture sensor 122, and accelerometer 124).

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC."

Reliability controller 116 may comprise any suitable system, device, or apparatus configured to receive one or more sensor inputs indicating environmental conditions within information handling system 102, and based thereon, determine whether a reliability-impacting event has occurred within information handling system 102. For example, in some embodiments, reliability controller 116 may primarily operate during shipment of information handling system 102 to a consumer of information handling system 102, to determine if a reliability-impacting event occurs during shipment. In addition, a "reliability-impacting event" may broadly include any event associated with information handling system 102 and detectable by one or more environmental sensors wherein such event indicates a substantial probability that one or more components of information handling system 102 may not operate properly in response to the reliability-impacting event. One non-limiting example of a reliability-impacting event includes condensation occurring within information handling system 102 that could lead to electrical shorting and damage if information handling system 102 is powered on with such condensation present. Another non-limiting example includes a mechanical shock event that could cause physical damage to one or more components, which could in turn cause additional damage if information handling system 102 is powered on with such physical damage unremedied.

As shown in FIG. 1, reliability controller 116 may include a microcontroller unit (MCU) 126, a memory 128, a battery 130, and one or more inputs for receiving sensor data from one or more environmental sensors (e.g., temperature sensor 119, humidity sensor 120, moisture sensor 122, and accelerometer 124).

MCU 126 may comprise a microprocessor, DSP, ASIC, FPGA, EEPROM, or any combination thereof, or any other device, system, or apparatus for carrying out the functionality of reliability controller 116. As such, MCU 126 may comprise firmware, logic, and/or data for controlling functionality of reliability controller 116.

Memory 128 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. In particular, memory 128 may include data and instructions that may be loaded and executed by MCU 126 in order to carry out the functionality of reliability controller 116. For example, memory 128 may store definitions of reliability-impacting events and remedies in response to reliability-impacting events. For example, memory 128 may store definitions of "direct" events such as a parameter measured by an environmental sensor exceeding a threshold value for such sensor. As another example, memory 128 may store definitions of "indirect" events that are algorithmically defined, such as a time rate of change of a dew point exceeding a threshold may indicate likelihood of condensation which itself is not directly detectable, or such as a spectral density of power over a frequency range of interest (e.g., as determined from readings from accelerometer 124) exceeding a particular threshold which may indicate a likelihood of mechanically-induced damage that may not be directly detectable.

In addition, in some embodiments, reliability controller 116 may interact with management controller 112 or other control circuitry/systems of information handling system to apply event-based policies to information handling system 102. Such policies may be defined within memory 128. For example, if reliability controller 116 detects the presence or likelihood of condensation, it may interact with management controller 112 such that management controller 112 prevents information handling system 102 from powering for a period of time following the condensation event. As another example, if reliability controller 116 detects the presence or likelihood of condensation, it may interact with management controller 112 such that management controller 112 powers on cooling fans of information handling system 102 while leaving the remainder of information handling system 102 powered down in order to assist in drying out affected or potentially-affected components. As a further example, if reliability controller 116 detects the presence or likelihood of a physical shock event (e.g., one which could have dislodged an electrical bus bar), it may interact with management controller 112 to prevent powering on of information handling system 102 pending a manual inspection of information handling system 102. As an additional example, reliability controller 116 may include a light or other visual indicator (not explicitly shown in FIG. 1) that provides a visual indication of a past and/or present reliability-impacting event in accordance with an event-based policy.

Battery 130 may comprise any system, device, or apparatus configured to store energy which may be used by reliability controller 116 to power components of reliability controller 116 to perform the functionality thereof. In some embodiments, battery 130 may comprise an electrochemical cell configured to convert stored chemical energy into electrical energy. In other embodiments, battery 130 may comprise a capacitor or "supercap" configured to store electrical energy and deliver such electrical energy to components of reliability controller 116.

Temperature sensor 119 may be any system, device, or apparatus (e.g., a thermometer, thermistor, etc.) configured to communicate a signal to reliability controller 116 indicative of a temperature proximate to or within information handling system 102.

Humidity sensor 120 may be any system, device, or apparatus (e.g., a hygrometer, etc.) configured to communicate a signal to reliability controller 116 indicative of a relative humidity proximate to or within information handling system 102.

Moisture sensor 122 may be any system, device, or apparatus configured to communicate a signal to reliability controller 116 indicative of presence of liquid water or other water proximate to or within information handling system 102.

Accelerometer 124 may include any system, device, or apparatus configured to measure acceleration (e.g., proper acceleration) experienced by information handling system 102.

Although FIG. 1 and the discussion above enumerates specific types of environmental sensors, it is understood that other types of environmental sensors may be employed by information handling system 102, and that any number of any types of environmental sensors may also be employed.

In these and other embodiments, environmental sensors may be strategically placed within information handling system 102 (e.g., within or proximate to hard disk drives or other data storage devices). In such cases, environmental sensors may be coupled to reliability controller 116 via wireless or wire-line transmissions.

In these and other embodiments, reliability controller 116 may include a wireless network interface (not shown in FIG. 1) that may be used to remotely query (e.g., via a handheld computing device, such as a tablet) reliability controller 116 in order to view reliability-impacting event information from such remote device.

In these and other embodiments, environmental sensors may be incorporated within modular information handling resources of information handling system 102. For example, a hard disk drive may incorporate an accelerometer 124, and if reliability controller 116 detects a reliability-impacting event, such event may be logged or otherwise reported by reliability controller 116, to which a technician or other user may simply replace the particular hard disk drive experiencing the reliability-impacting event.

In addition to processor 103, memory 104, network interface 108, management controller 112, and reliability controller 116, and environmental sensors, information handling system 102 may include one or more other information handling resources.

Although FIG. 1 depicts information handling system 102 as only having a single host system 98 for the purposes of clarity and exposition, in some embodiments, information handling system 102 may comprise a server rack including a plurality of racks of host systems 98.

FIG. 2 illustrates a flow chart of an example method 200 for reliability control of an information handling system, in accordance with certain embodiments of the present disclosure. According to some embodiments, method 200 may begin at step 202. As noted above, teachings of the present disclosure may be implemented in a variety of configurations of information handling system 102.

At step 202, an information handling system 102 including reliability controller 116 and environmental sensors may be shipped from a manufacturer or other provider of information handling system 102. At step 204, during shipping, reliability controller 116 may monitor for reliability-impacting events, as may be defined by information stored in memory 128. At step 206, reliability controller 116 may determine if any reliability-impacting events occur within a particular period of time, wherein such particular period of time may be related to a period of time required to ship information handling system 102 to its intended destination. If a reliability-impacting event has occurred, method 200 may proceed to step 208. If a reliability-impacting event does not occur, method 200 may end.

At step 208, in response to occurrence of a reliability-impacting event, reliability controller 116 may, alone or in concert with management controller 112 or another component of information handling system 102, apply an event-based policy to the operation of information handling system 102, as described above. After application of the event-based policy, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A reliability controller for an information handling system, wherein the reliability controller includes:
one or more environmental sensor inputs configured to receive data from one or more environmental sensors of an information handling system, wherein the information handling system includes a host system, comprising a central processing unit (CPU) communicatively coupled to a host memory, and a management controller, comprising a management controller processor communicatively coupled to the host processor, wherein the one or more environmental sensors include an accelerometer; and
a microcontroller unit, distinct from the CPU and the management controller processor, wherein the microcontroller unit is communicatively coupled to the one or more environmental sensor inputs and configured to perform reliability control operations, wherein the reliability control operations include:
monitoring, during shipping of the information handling system with the host system and the management controller in a powered-off state, the one or more environmental sensor inputs for sensor data indicative of one or more reliability impacting events occurring during said shipping, wherein the one or more reliability impacting events include:
a mechanical damage event, wherein the mechanical damage event is indicated by data from the accelerometer indicating an acceleration of the information handling system exceeding a threshold acceleration;
in response to detecting a reliability impacting event during shipping of the information handling system, performing one or more reliability policy actions, wherein the one or more reliability policy actions include:
a mechanical damage action performed in response to detecting a mechanical damage event, wherein the mechanical damage action includes preventing powering on of the host system processor pending an inspection of the information handling system.

2. The reliability controller of claim 1, wherein the one or more environmental sensors include at least one of a temperature sensor and a humidity sensor.

3. The reliability controller of claim 1, wherein the one or more environmental sensors include at least one of a temperature sensor, a humidity sensor, and a moisture sensor, and wherein the one or more reliability impacting events include:
a condensation event indicative of condensation within the information handling system.

4. The reliability controller of claim 3, wherein condensation event is indicated by a time rate of change of a dew point associated with the information handling system exceeding a threshold rate.

5. The reliability controller of claim 4, wherein the one or more reliability policy actions includes a condensation action for powering on a cooling fan of the information handling system and preventing powering on of at least one other component of the information handling system for a selected period of time responsive to detecting sensor data satisfying the condensation event.

6. A reliability control method for an information handling system, the reliability control method comprising:
monitoring, by a reliability controller of the information handling system, during shipping of the information handling system with a host system and a management controller of the information handling system in a powered-off state, one or more environmental sensor inputs for sensor data indicative of one or more reliability impacting events occurring during said shipping, wherein the one or more reliability impacting events include:
a mechanical damage event, wherein the mechanical damage event is indicated by data from the accelerometer indicating an acceleration of the information handling system exceeding a threshold acceleration;
in response to detecting a reliability impacting event during shipping of the information handling system, performing one or more reliability policy actions, wherein the one or more reliability policy actions include:
a mechanical damage action performed in response to detecting a mechanical damage event, wherein the mechanical damage action includes preventing powering on of the host system processor pending an inspection of the information handling system.

7. The-reliability control method of claim 6, wherein the one or more environmental sensors include at least one of a temperature sensor and a humidity sensor.

8. The reliability method of claim 6, wherein the one or more environmental sensors include at least one of a temperature sensor, a humidity sensor, and a moisture sensor, and wherein the one or more reliability impacting events include:
a condensation event indicative of condensation within the information handling system.

9. The method of claim 8, wherein the condensation event is indicated indirectly by a time rate of change of a dew point associated with the information handling system exceeding a threshold rate of change.

10. The method of claim 8, wherein the reliability policy includes a provision for powering on a cooling fan of the information handling system and preventing powering on of at least one other component of the information handling system for a selected period of time responsive to detecting the condensation event.

11. An information handling system comprising:
a host system including a host processor coupled to a host memory and to a host network interface configured to couple the host processor to a data network;
a management controller communicatively coupled to the host processor, wherein the management controller includes a management controller processor communicatively coupled to a management network interface configured to couple the management controller processor to a management network;
one or more environmental sensors wherein the one or more environmental sensors include an accelerometer; and
a reliability controller comprising:
one or more environmental sensor inputs configured to receive data from the one or more environmental sensors; and
a microcontroller unit communicatively coupled to the one or more environmental sensor inputs and configured to perform reliability monitoring operations, wherein the reliability monitoring operations include:

monitoring, during shipping of the information handling system with the host system and the management controller in a powered-off state, the one or more environmental sensor inputs for sensor data indicative of one or more reliability impacting events occurring during said shipping, wherein the one or more reliability impacting events include:

a mechanical damage event, wherein the mechanical damage event is indicated by data from the accelerometer indicating an acceleration of the information handling system exceeding a threshold acceleration;

in response to detecting a reliability impacting event during shipping of the information handling system, performing one or more reliability policy actions, wherein the one or more reliability policy actions include:

a mechanical damage action performed in response to detecting a mechanical damage event, wherein the mechanical damage action includes preventing powering on of the host system processor pending an inspection of the information handling system.

12. The information handling system of claim 11, wherein the one or more environmental sensors include at least one of a temperature sensor, a humidity sensor, and a moisture sensor, and wherein the one or more reliability impacting events include:

a condensation event indicative of condensation within the information handling system.

13. The information handling system of claim 12, wherein the condensation event is indicated by a time rate of change of a dew point associated with the information handling system exceeding a threshold rate of change.

14. The information handling system of claim 12, wherein the one or more reliability policy actions include a condensation action for powering on a cooling fan of the information handling system and preventing powering on of at the host system for a selected period of time responsive to detecting the condensation event.

* * * * *